United States Patent
Van Gorp et al.

(10) Patent No.: US 10,095,886 B2
(45) Date of Patent: Oct. 9, 2018

(54) SYSTEMS AND METHODS FOR VERIFICATION AND DEPLOYMENT OF APPLICATIONS TO PROGRAMMABLE DEVICES

(71) Applicant: SCHNEIDER ELECTRIC USA, INC., Andover, MA (US)

(72) Inventors: John C. Van Gorp, Sidney (CA); Piotr Boleslaw Przydatek, Victoria (CA); Liam Somers, Vancouver (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 171 days.

(21) Appl. No.: 15/022,855

(22) PCT Filed: Sep. 20, 2013

(86) PCT No.: PCT/US2013/060877
§ 371 (c)(1),
(2) Date: Mar. 17, 2016

(87) PCT Pub. No.: WO2015/041670
PCT Pub. Date: Mar. 26, 2015

(65) Prior Publication Data
US 2016/0232366 A1 Aug. 11, 2016

(51) Int. Cl.
*G06F 21/62* (2013.01)
*G06F 9/455* (2018.01)
(Continued)

(52) U.S. Cl.
CPC .......... *G06F 21/629* (2013.01); *G06F 9/455* (2013.01); *G06F 9/542* (2013.01); *G06F 17/5009* (2013.01)

(58) Field of Classification Search
CPC .... G06F 21/629; G06F 9/542; G06F 17/5009; G06F 9/455
See application file for complete search history.

(56) References Cited

U.S. PATENT DOCUMENTS

| | | | | |
|---|---|---|---|---|
| 9,110,496 B1 * | 8/2015 | Michelsen | ................ | G06F 1/00 |
| 2003/0171907 A1 * | 9/2003 | Gal-On | ................... | G06F 8/447 |
| | | | | 703/14 |

(Continued)

OTHER PUBLICATIONS

Extended European Search Report from corresponding European Application No. 13893941.8 dated Mar. 6, 2017.

(Continued)

*Primary Examiner* — Robert Leung
*Assistant Examiner* — Thomas Ho
(74) *Attorney, Agent, or Firm* — Lando & Anastasi, LLP

(57) ABSTRACT

A system for verifying applications for Real-Time Execution (RTE) devices is provided. The system includes a memory, at least one processor coupled to the memory, and a simulation component executable by the at least one processor. The simulation component may be configured to receive device simulation information for an RTE device, the device simulation information including device configuration information, application information, and targeted performance information, configure a virtual device simulator to simulate performance of the RTE device, run the virtual device simulator to process one or more simulated events, and output simulation results.

20 Claims, 5 Drawing Sheets

(51) Int. Cl.
*G06F 9/54* (2006.01)
*G06F 17/50* (2006.01)

(56) References Cited

U.S. PATENT DOCUMENTS

| | | | | |
|---|---|---|---|---|
| 2005/0004787 | A1* | 1/2005 | Kubischta | G06F 1/14 |
| | | | | 703/19 |
| 2005/0193184 | A1 | 9/2005 | Kohno et al. | |
| 2006/0058976 | A1 | 3/2006 | Ferris | |
| 2007/0174915 | A1* | 7/2007 | Gribble | G06F 21/53 |
| | | | | 726/24 |
| 2009/0319247 | A1* | 12/2009 | Ratcliffe, III | G09B 19/0053 |
| | | | | 703/13 |
| 2010/0011237 | A1 | 1/2010 | Brooks et al. | |
| 2010/0114549 | A1 | 5/2010 | Kolavi | |
| 2010/0318973 | A1* | 12/2010 | Rautiainen | G06F 9/455 |
| | | | | 717/135 |
| 2011/0044438 | A1* | 2/2011 | Wang | H04W 4/206 |
| | | | | 379/93.02 |
| 2012/0084324 | A1* | 4/2012 | Lloyd | G05B 23/0213 |
| | | | | 707/784 |
| 2014/0046645 | A1* | 2/2014 | White | G06F 17/509 |
| | | | | 703/13 |
| 2015/0096025 | A1* | 4/2015 | Ismael | H04L 63/145 |
| | | | | 726/23 |
| 2016/0379125 | A1* | 12/2016 | Bordawekar | G06N 7/005 |
| | | | | 706/12 |

OTHER PUBLICATIONS

Notification of Transmittal of the International Search Report and the Written Opinion of the International Searching Authority from corresponding PCT/US2013/060877 dated Apr. 9, 2014.

PowerLogic®ION Setput, Meter Confguration Tool—User Guide, Dec. 2007, Schneider Electric, pp. 1-124.

\* cited by examiner

SYSTEMS AND METHODS FOR VERIFICATION AND DEPLOYMENT OF APPLICATIONS TO PROGRAMMABLE DEVICES

CROSS-REFERENCE TO RELATED APPLICATIONS

This application is a U.S. National Stage Application under 35 U.S.C. § 371 of International Application No. PCT/US2013/060877, filed Sep. 20, 2013, titled SYSTEMS AND METHODS FOR VERIFICATION AND DEPLOYMENT OF APPLICATIONS TO PROGRAMMABLE DEVICES, which is hereby incorporated herein by reference in its entirety.

BACKGROUND

Technical Field

The technical field relates generally to the verification and deployment of software applications to programmable devices.

Background Discussion

Some programmable devices support Real-Time Execution (RTE) of processes that have time constraints for the performance of various operations. Some RTE devices run one "monolithic" program (e.g. firmware) with several predefined internal functions. Changing the functionality of these devices may require developing, testing, and deploying new firmware.

Programmable devices may also support RTE by the installation of a Real-Time Operating System (RTOS) that enables the development and deployment of separate applications. The RTOS devices may support the execution of multiple applications simultaneously. The performance of the RTOS device, however, may vary substantially with each combination of applications running simultaneously. Unlike General-Purpose Operating Systems (GPOS), RTOS devices may not be able to defer execution of an application as needed if an application becomes unstable.

SUMMARY

According to one aspect, a system for verifying applications for RTE devices is provided. The system comprises a memory, at least one processor coupled to the memory, and a simulation component executable by the at least one processor. The simulation component may be configured to receive device simulation information for an RTE device, the device simulation information including device configuration information, application information, and targeted performance information, configure a virtual device simulator to simulate performance of the RTE device, run the virtual device simulator to process one or more simulated events, and output simulation results.

According to one embodiment, the device simulation information further includes historical event information. The simulation component may further be configured to run the virtual device simulator based on the historical event information.

According to one embodiment, the output simulation results include a determination of whether the virtual device simulator executed processes in the one or more applications in compliance with the targeted performance information. The output simulation results may further include a suggested set of one or more devices configured to execute the processes in the one or more applications in compliance with the targeted performance information.

According to one embodiment, the system further comprises a network interface coupled to the processor and at least one remote device and a deployment component executable by the at least one processor. The deployment component may be configured to determine whether the virtual device simulator executed processes in the one or more applications in compliance with the targeted performance information and deploy the device configuration and applications to the remote device.

According to one embodiment, the system further comprises an application store component executable by the processor and configured to provide one or more users access to RTE applications. In this embodiment, the RTE device may include a Real-Time Operating System (RTOS) device and the RTE applications include RTOS power monitoring applications.

According to one aspect, a method for verifying applications for RTE devices is provided. The method comprises receiving, via at least one processor, device simulation information for an RTE device, the device simulation information including device configuration information, application information, and targeted performance information, configuring a virtual device simulator to simulate performance of the RTE device, running the virtual device simulator to process one or more simulated events, and outputting simulation results.

According to one embodiment, receiving the RTE device configuration information further includes receiving historical event information. In this embodiment, running the virtual device simulator may further include running the virtual device simulator based on the historical event information.

According to one embodiment, outputting simulation results includes outputting a determination of whether the virtual device simulator executed processes in the one or more applications in compliance with the targeted performance information. In this embodiment, outputting simulation results may further include outputting a suggested set of one or more devices configured to execute processes in the one or more applications in compliance with the targeted performance information.

According to one embodiment, the method further comprises determining whether the virtual device simulator executed processes in the one or more applications in compliance with the targeted performance information and deploying, via a network interface coupled to a remote device and the at least one processor, the device configuration and applications to the remote device.

According to one embodiment, the memory includes a database of RTE applications and the method further comprises providing one or more users access to RTE applications.

According to one aspect, a non-transitory computer readable medium storing sequences of instructions executable by at least one processor, the sequences of instructions instructing the at least one processor to execute a process of verifying applications for RTE devices is provided. The sequences of instructions including instructions configured to receive device simulation information for an RTE device, the device simulation information including device configuration information, application information, and targeted performance information, configure a virtual device simulator to simulate performance of the RTE device, run the virtual device simulator to process one or more simulated events, and output simulation results.

According to one embodiment, the device simulation information further includes historical event information. In this embodiment, the instructions to run the virtual device simulator may include instructions to run the virtual device simulator based on the historical event information.

According to one embodiment, the instructions to output simulation results include instructions to output a determination of whether the virtual device simulator executed processes in the one or more applications in compliance with the targeted performance information.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "another embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
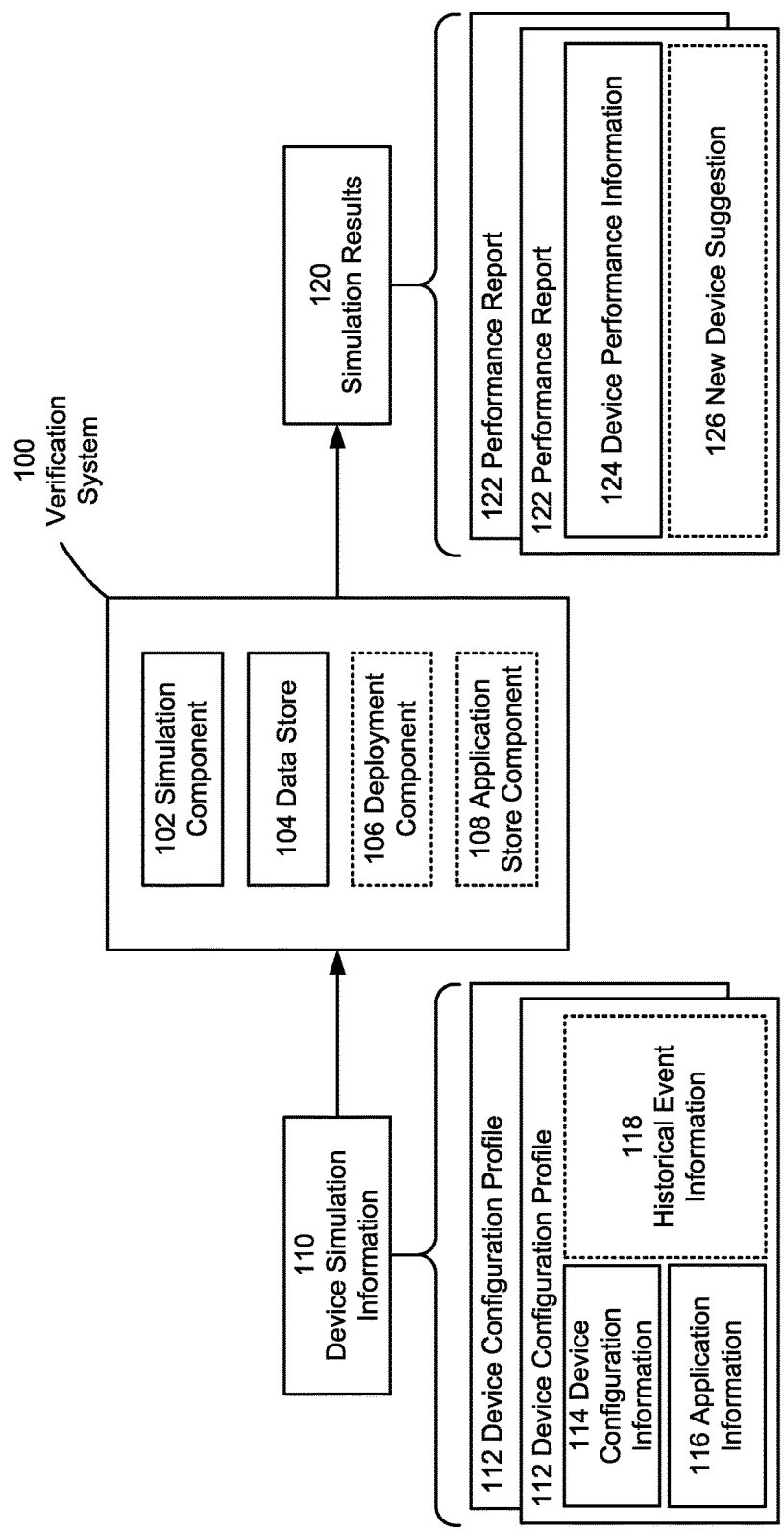
FIG. 1 is a block diagram of an example verification system.

Some embodiments disclosed herein include apparatus and processes for application verification and deployment. According to various embodiments, a verification system is provided to simulate the performance of a particular device in a given scenario. The verification system ensures that all functions defined by the applications execute as required. The verification system may utilize a standard suite of simulated events (e.g., waveform captures) and/or previously recorded actual events as input for the device simulation. The verification system outputs a performance report that summarizes the performance of the simulated device in the given scenario. The performance report may further indicate compatibility of one or more applications with the simulated device.

In some embodiments, the verification system includes facilities for application deployment. In these embodiments, the verification system deploys a device configuration to a device currently in operation. For example, the verification may simulate the performance of a power monitoring device with a new device configuration. The verification system may determine that the power monitoring device is capable of performing the tasks required by the new device configuration. The verification system may then deploy the verified new device configuration to the power monitoring device.

In one embodiment, the verification system includes an application store that allows the purchase and installation of various applications (e.g., a transformer loss compensation application). For example, the verification system may include an interface that allows a user to select specific applications to purchase and download or optionally deploy directly to a device. In addition, the verification system may simulate the performance of one or more applications on a device and present an indication of the compatibility of the applications with the device.

In another embodiment, the verification system is coupled to an application store that allows purchases and installations of various applications. In this embodiment, the verification system communicates with the application store via one or more interfaces. The verification system may receive simulation information and output simulation results to the application store. In this embodiment, the application store may receive and store the simulation results. The application store may present the simulated results to a user to illustrate possible configurations for various devices.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Application Verification System

Some embodiments disclosed herein implement an application verification system using one or more computer systems, such as the computer systems described below with reference to FIG. 4. According to these embodiments, an application verification system simulates the performance of one or more applications being executed by a programmable device, such as the programmable device described below with reference to FIG. 3.

FIG. 1 illustrates an example application verification system 100. As shown in FIG. 1, the verification system 100 includes simulation component 102 in addition to a data store 104 and optionally includes a deployment component 106 and an application store component 108. The verification system 100 accepts device simulation information 110 as an input. The device simulation information 110 may include a device configuration profile 112 that comprises device configuration information 114, application information 116, and optionally historical event information 118. The verification system 100 outputs simulation results 120 that may include a performance report 122 that comprises device performance information 124 and optionally a new device suggestion 126.

The verification system 100 simulates the performance of a programmable device (e.g., an RTE device) executing instructions from one or more applications. According to one embodiment, an RTE device is a device that guarantees execution of one or more tasks within a specific time constraint. For example, the time constraint for a power monitoring RTE device may include one of a ½ power cycle time constraint (e.g., $1/120^{th}$ of a second for a 60 Hz power network), 1 power cycle time constraint (e.g., $1/60^{th}$ of a second for a 60 Hz power network), and 1 second time constraint. The guaranteed execution of one or more tasks within a specific time constraint may be achieved by, for example, the installation of firmware or a RTOS on a device.

According to one embodiment, an RTE device is an electronic device that employs an RTOS (e.g., an RTOS device). Example RTOSs include, for example, RTLinux, VxWorks, AMX, EmbOS, QuadROS, QNX Neutrino, and LynxOS. In this embodiment, an RTOS is an operating system that guarantees execution of one or more tasks within a specific time constraint. For example, the RTOS device may be a PowerLogic ION monitoring device manufactured by Schneider Electric that is configured for monitoring power.

The verification system 100 receives device simulation information 110 from a user of the verification system 100 or from another system. The device simulation information 100 may include device configuration profiles 112 that include a set of relevant information to describe the specific characteristics of an operational scenario. The device configuration profile includes device configuration information 114 that may include, for example, RTOS configuration settings (e.g., page size, file system, etc.), hardware information (e.g., the make and model of the device), and targeted performance information. The targeted performance information may include targeted performance metrics such as, but not limited to, minimum device sampling rates and maximum task execution times. The device configuration profile may further include application information 116 that may include, for example, information regarding the specific set of applications to be executed by the device. The application information 116 may further include application priority information that specifies which application in a given set of applications receives priority access to the usage of computing resources of the device.

In some embodiments, the device simulation information 110 includes historical event information 118. The historical event information may include, for example, information describing the processing that occurred on the received information and the system performance during the processing. For example, a power quality monitoring device may be installed at a facility. Data received by the sensors integrated with or operatively connected to the power quality monitoring device may be logged as historic data. The logged historic data may then be utilized as input to the verification system 100. In these embodiments, the verification system uses the logged historic data as input data for the virtual device model. In addition, a direct comparison may be computed between the output of the device in current operation and the output of the modeled device with a new configuration.

In one embodiment, the verification system 100 simulates various scenarios based on the input device simulation information 110. The verification system utilizes a simulation component 102 to perform the simulation. The simulation component configures a virtual device simulator (e.g., virtual device simulator 202 in FIG. 2 described below) to simulate the performance of the received device simulation information 110. The configuration process may include accessing a data store 104 to retrieve additional information regarding the specific scenario to be simulated. For example, the device simulation information 110 may specify a particular make and model number of device to simulate. The simulation component 102 may retrieve processor speed information associated with the make and model number of the device from the data store 104 to improve the accuracy of the simulation. The virtual device simulator may then simulate the performance of the device based on received historical event information 118 or based on a suite of simulated events (e.g., captured event waveforms). The suite of simulated events may be selected by the simulation component 102 to stress the configured virtual device simulator. In addition, the simulation component may select specific types of signals as well as the timing of simulated events from the suite of simulated events.

In one embodiment, the simulation component 102 outputs simulation results 120. These simulation results may include a performance report 122. The performance report 122 includes device performance information 124 that outlines how the device performed during the simulation. The device performance information 124 may include an indication of whether the device performed in compliance with the targeted performance information. In the event that the device did not perform in compliance with the targeted performance information, the device performance information 124 may further include an indication of where the device failed to operate during the simulation. The report may note the percentage of time each application provided output during each system process cycle, and whether or not the virtual device resources were constrained during any simulated event such that execution of one application was prioritized over another.

In some embodiments, the performance report 122 includes a new device suggestion 126. As described above, the data store 104 may include specific information regarding various devices (e.g., processor speed, memory, etc.). A set of criteria may be determined by the verification system 100 that are the minimum specifications for a device to perform in compliance with the targeted performance information in the input device simulation information 110. For example, a device configuration profile 112 may fail during the simulation because the processor included in the device configuration profile 112 is not fast enough to perform all of the operations defined within the scenario. In this example, the verification system 100 may determine a minimum required processor speed and determine which devices in the data store 104 meet the requirement. The devices that contain processors fast enough to execute the set of applications may be subsequently returned as a new device suggestion 126.

In one embodiment, the verification system 100 further includes a deployment component 106 that allows a specific device configuration to be deployed to a device in the field. For example, a power quality monitoring device may operate within a distributed control system (DCS). The verification system may simulate a new device configuration for the power quality monitoring device and determine that all operations executed in compliance with the targeted performance information. The deployment component 106 may then transmit the new device configuration to the DCS via a network connection for deployment to the power quality monitoring device. It is appreciated that the verification system 100 may also directly deploy the device configuration to the device. In addition, the deployment component 106 may require a signature (e.g., from the simulation component 102) that certifies the compliance of a specific device configuration with the targeted performance information prior to deploying the specific device configuration to a device.

In one embodiment, the verification system 100 signs specific device configuration profiles 112. The signature from the verification system 100 certifies that the device configuration has been tested (e.g., through virtual device simulation) and is in compliance with the targeted performance information. After a signed device configuration has been deployed to a device in the field, the device may track any changes to the device configuration. The device may void the device configuration signature if one or more configuration settings are changed (e.g., by a technician in the field) while the device is in operation.

In some embodiments, the verification system 100 further comprises an application store component 108. The application store component 108 facilitates the distribution and sale of applications for RTE devices. The application store component 108 may include an interface that allows a user to select specific applications to purchase and download or optionally deploy directly to the device via the deployment component 106. In addition, the application store component 108 may interact with the simulation component 102 to determine whether an application of interest to a user is compatible with a current device and configuration of the user.

Figure 2:
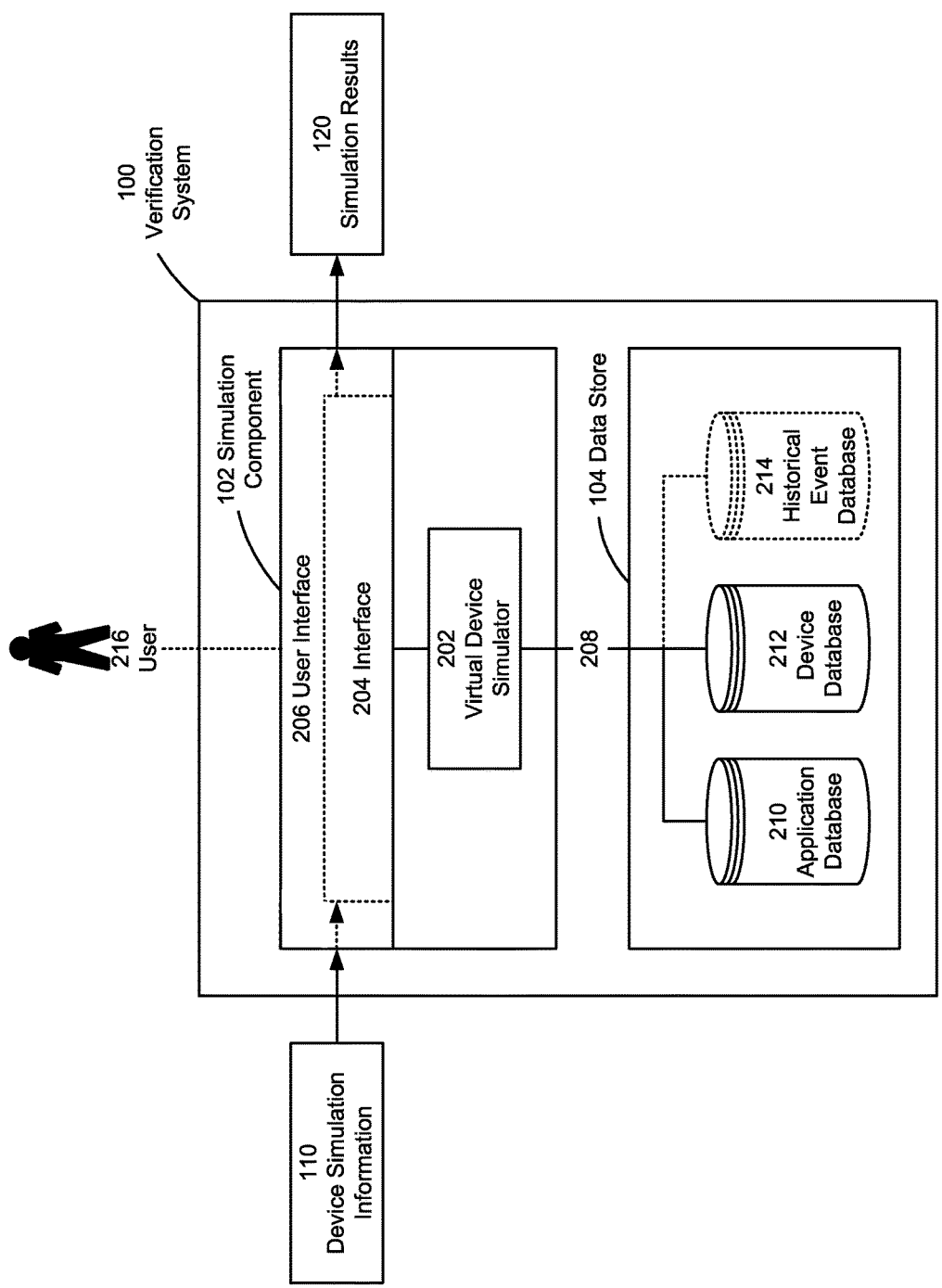
FIG. 2 is a block diagram of another example verification system.

FIG. 2 illustrates another example application verification system 100. The verification system 100 includes a simulation component 102, the simulation component 102 comprising a virtual device simulator 202, an interface 204, and optionally a user interface 206. The simulation component is coupled to a data store 104, the data store 104 comprises an application database 210, a device database 212, and optionally a historical event database 214, via a network 208. The simulation component 102 may optionally be controlled by a user 216. The verification system receives device simulation information 110 as an input and outputs simulation results 120.

In one embodiment, the simulation component 102 includes an interface 204 configured to receive the device simulation information 110. The simulation component 102 may optionally include a user interface 206 illustrated as being included in the interface 204. The user interface 206 accepts input from a user regarding the simulation (e.g., device simulation information 110) and displays the simulation results 120. The user interface 206 may further accept input from a user 216 regarding simulation parameters. For example, a user 216 may upload device simulation information 110 to the simulation component 102 via a device associated with and/or operated by the user 216. The user interface 206 may then accept input entered by the user 216 to change one or more simulation parameters (e.g., the priority of various applications).

In one embodiment, the simulation component 102 further includes a virtual device simulator 202. The virtual device simulator 202 simulates the performance of the received device simulation information 110. The virtual device simulator 202 accesses the data store 104 via a network 208. As described above, the virtual device simulator 202 may access the data store 104 to gather detailed information associated with the simulated scenario (e.g., the processor speed of a specific device). The data store 104 may include an application database 210 that stores information particular to various applications. This information may include, for example in the case of monitoring devices, the measurement inputs accepted by the application, a description of the processes cycle each measurement operates within, internal periodic timers used within the application, a description of the frequency of each periodic timer, output generated by the application, a description of the processing cycle the output parameters operate within, and a priority, if any, associated with the application that was assigned by the developer.

In some embodiments, the data store 104 includes a historical event database 214. As described above with regard to the historical event information 118 in a device configuration profile 112, the historical database 214 may store this information. The data in the historical database 214 may be employed to augment the simulation results 120 of various scenarios with actual data. Such data may include actual measurement events and data captured by the device, accompanied by performance metrics for the applications running on the device. The stored performance metrics may be utilized to train the virtual device simulator 202 and/or augment the simulation results. For example, the historical database 214 may include gathered performance information regarding a specific monitoring device with a set of applications. The gathered performance information may be employed to output additional simulation results 120 in the event that a similar scenario is input to the verification system 100.

In one embodiment, the verification system 100 is operatively connected to one or more devices via the interface 204. In this embodiment, the verification system 100 verifies that a given device can properly execute the tasks specified by the input device simulation information 110 by configuring a physical device consistent with the input device simulation information 110. For example, the simulation component 102 may identify a device operatively connected to the verification system 100 that matches the device identified in the input device simulation information 110. The simulation component 102 may then transmit device configuration information to the identified device. In addition, the simulation component 102 may monitor the identified device while the identified device completes the tasks specified by the device simulation information 110 and/or selected from a suite of simulated events.

Programmable Device

As discussed above, various programmable devices that employ RTOSs support the development and deployment of separate applications (e.g., transformer loss compensation) in the "user space" of the programmable. Applications for these programmable devices may be created by any third-party or the device manufacturer. Various aspects and functions described herein may simulate at least one application executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, power and resource monitoring devices, protection relays, programmable logic controllers, and utility meters, such as a utility meter 300 as illustrated in FIG. 3.

Figure 3:
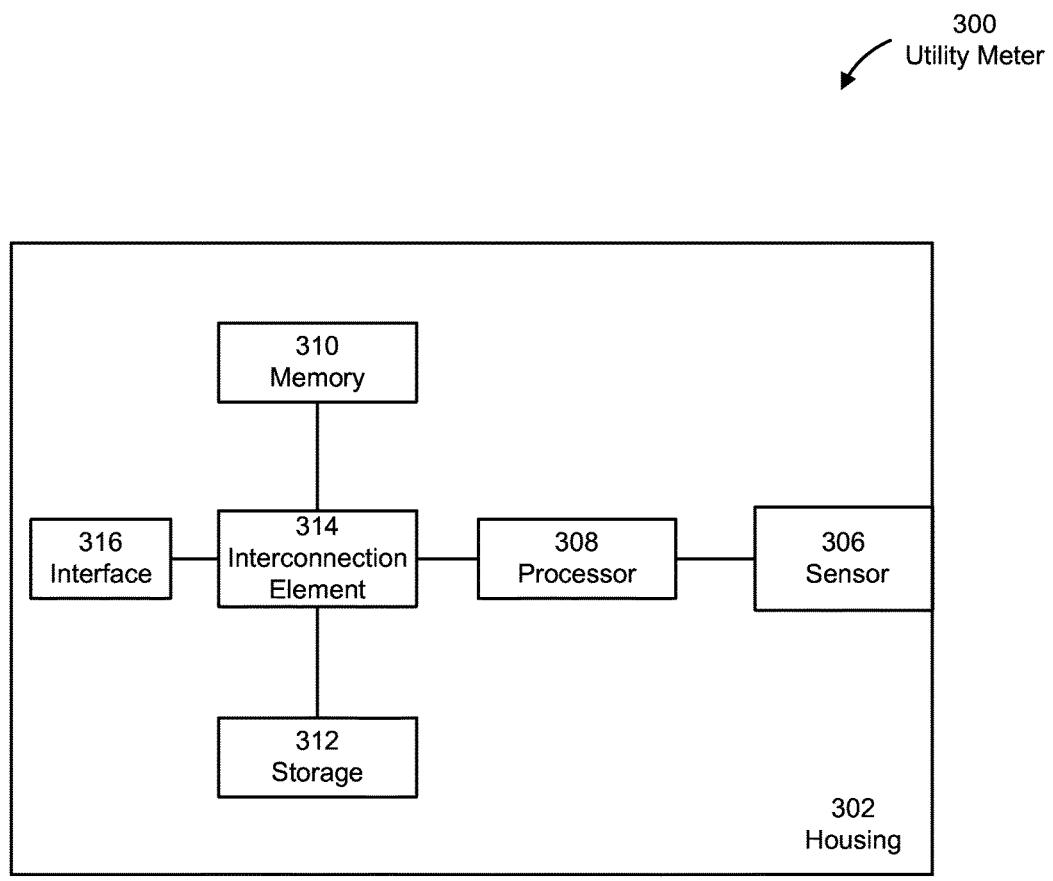
FIG. 3 is a block diagram of an example programmable device.

As shown in FIG. 3, the utility meter 300 comprises a housing 302 that includes, a sensor 306, a processor 308, a memory 310, a data storage device 312, an interconnection element 314, and an interface 316. To implement at least some of the aspects, functions, and processes disclosed herein, the processor 308 performs a series of instructions that result in manipulated data. The processor 308 may be any type of processor, multiprocessor, or controller.

The memory 310 stores programs and data during operation of the utility meter 300. Thus, the memory 310 include any device for storing data, such as a disk drive or other non-volatile storage device, but typically includes a relatively high performance, volatile, random access memory such as a dynamic random access memory (DRAM) or static memory (SRAM). Various embodiments may organize the memory 310 into particularized and, in some cases, unique structures to perform the functions disclosed herein. These data structures may be sized and organized to store values for particular data and types of data.

As shown in FIG. 3, several of the components of the utility meter 300 are coupled to the interconnection element 314. The interconnection element 314 may include any communication coupling between components of the utility meter, such as one or more physical busses subscribing to one or more specialized or standard computing bus technologies such as IDE, SCSI, and PCI. The interconnection element 314 enables communications, such as data and instructions, to be exchanged between components of the utility meter 300.

The utility meter 300 also includes one or more interface devices 316 such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the utility meter 300 to exchange information with and to communicate with external entities, such as users and other systems.

The data storage device 312 includes a computer readable and writeable nonvolatile, or non-transitory, data storage medium in which instructions are stored that define a program or other object that is executed by the processor 308. The data storage 312 also may include information that is recorded, on or in, the medium, and that is processed by the processor 308 during execution of the program. More specifically, the information may be stored in one or more data structures specifically configured to conserve storage space or increase data exchange performance. The instructions may be persistently stored as encoded signals, and the instructions may cause the processor 308 to perform any of the functions described herein. The medium may, for example, be optical disk, magnetic disk or flash memory, among others.

As shown in FIG. 3, the sensor 306 is coupled to the processor 308. The sensor 306 includes an analog sensor and analog to digital converter to provide the processor 308 with a digital signal that represents a quantity of flow (e.g. usage) of a utility as detected by the analog sensor. The particular configuration of the sensor 306 varies depending on the utility being measured by the utility meter 300. For example, in an embodiment including a meter that measures electricity, the sensor 306 includes inputs for single phase or three phase power and records periodic measurements of one or more identified characteristics (e.g., power, voltage, current, etc.) of the electric circuit via the inputs. Upon receipt of these periodic measurements, the processor 308 stores information descriptive of the measurements and the times that the measurements were taken in the data storage element 312. Further, in some embodiments, the processor 308 subsequently transmits the stored information descriptive of the measurements to an external entity via a network interface included in the interface devices 316.

In addition, in several examples the processor 308 is configured to execute a conventional RTOS, such as RTLinux. In these examples, the RTOS may provide platform services for application software. Application software may include, for example, power monitoring applications. These platform services may include inter-process and network communication, file system management and standard database manipulation. However, one of many operating systems may be used, and examples are not limited to any particular operating system or operating system characteristic.

Some embodiments of the utility meter 300 include operational parameters that may be configured via protected functionality provided by the utility meter 300. These operational parameters may be used to configure CT/PT ratio, system type, demand calculations, I/O setup, onboard data logging, onboard waveform capture, and onboard alarming.

Although the utility meter 300 is shown by way of example as one type of utility meter upon which various aspects and functions may be practiced, aspects and functions are not limited to being implemented on the utility meter 300 as shown in FIG. 3. Various aspects and functions may be practiced on one or more utility meters having a different architectures or components than that shown in FIG. 3. For instance, the utility meter 300 may include specially programmed, special-purpose hardware, such as an application-specific integrated circuit (ASIC) tailored to perform one or more particular operations disclosed herein.

In some examples, the components of the utility meter 300 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 4:
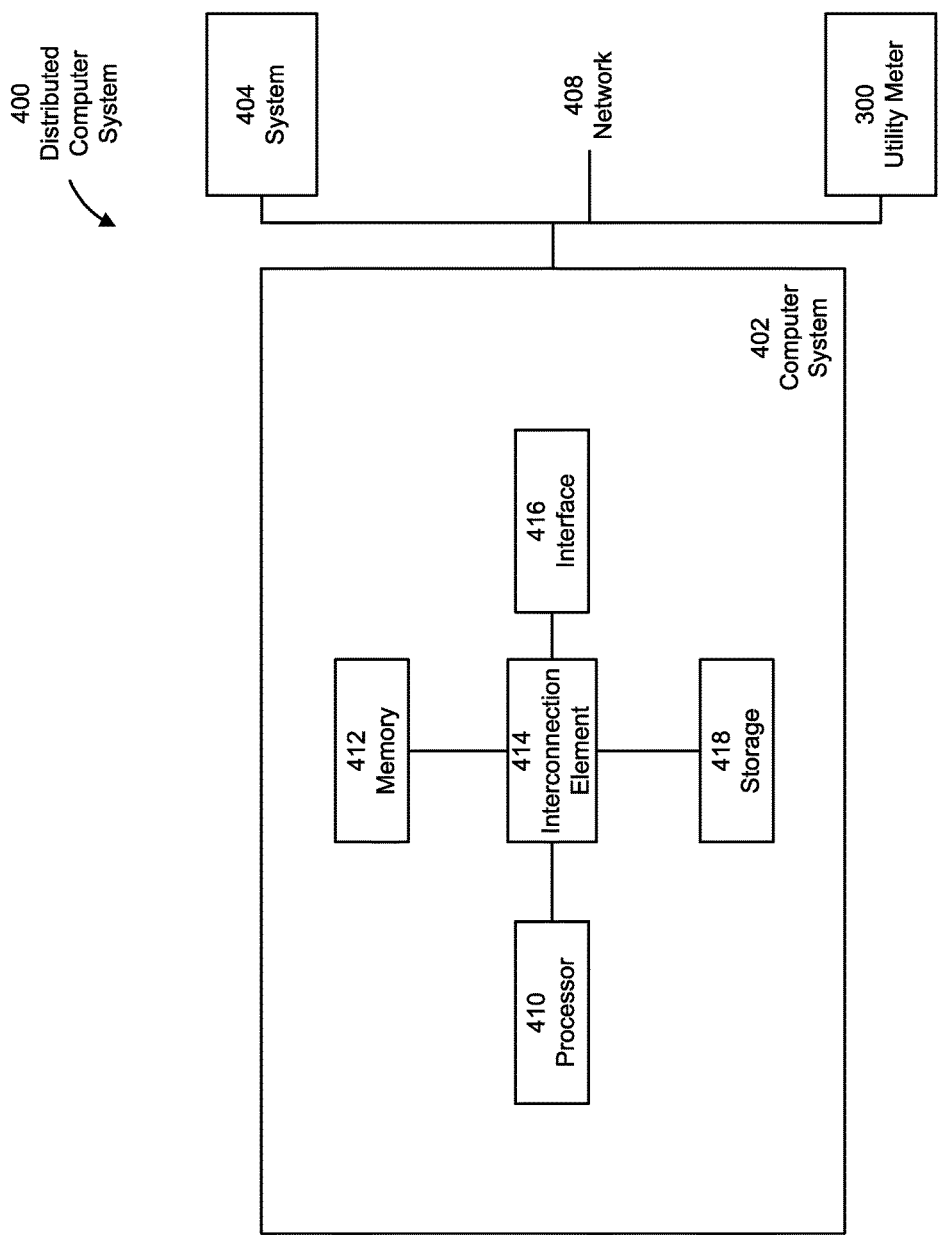
FIG. 4 is a block diagram of an example of a computer system that executes processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402 and 404 and utility meter 300. As shown, the computer systems 402 and 404 and utility meter 300 are interconnected by, and may exchange data through, a communication network 408. The network 408 may include any communication network through which computer systems may exchange data. To exchange data using the network 408, the computer systems 402 and 404 and utility meter 300 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 402 and 404 and utility meter 300 may transmit data via the network 408 using a variety of security measures including, for example, TLS, SSL, or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, an interconnection element 414, an interface 416 and data storage element 418. To implement at least some of the aspects, functions, and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 410 is connected to other system components, including one or more memory devices 412, by the interconnection element 414.

The memory 412 stores programs and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other nonvolatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the interconnection element 414. The interconnection element 414 may include any communication coupling between system components such as one or more physical busses in conformance with specialized or standard computing bus technologies such as IDE, SCSI, PCI and InfiniBand. The interconnection element 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista, Windows 7, or Windows 8 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Application Verification Processes

Figure 5:
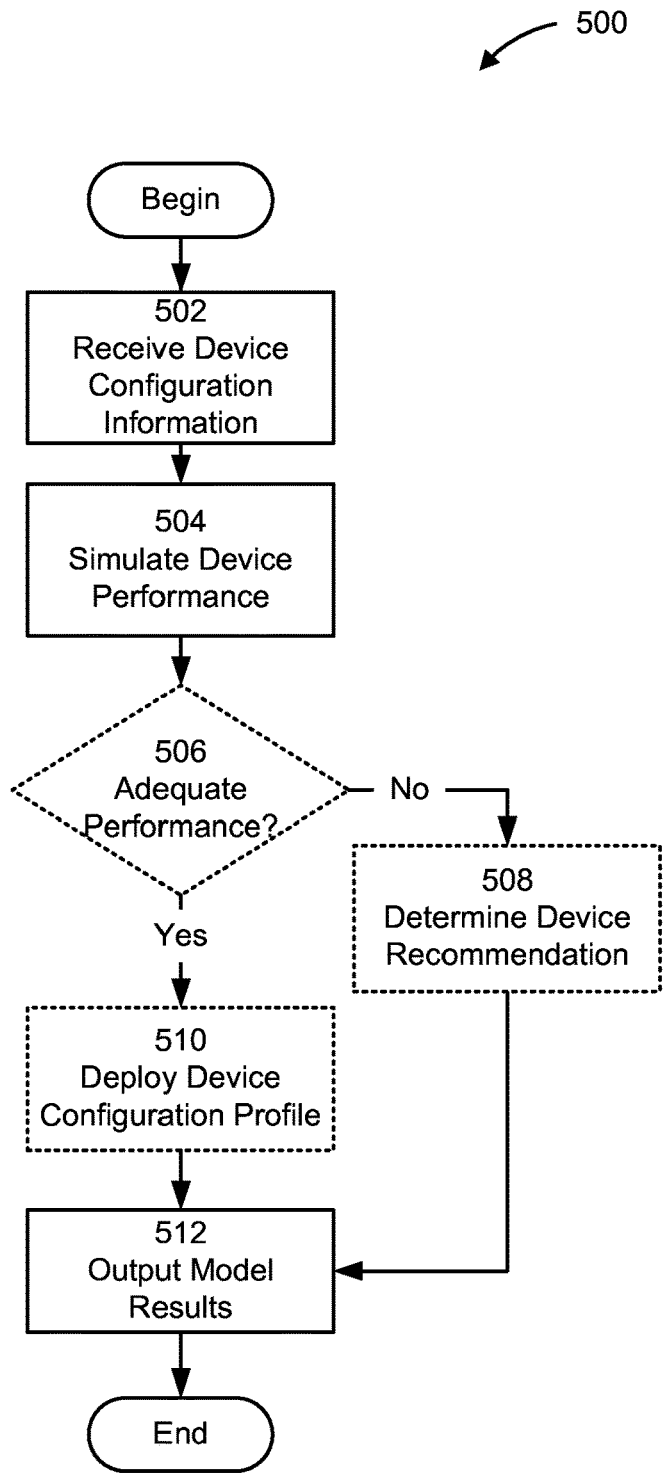
FIG. 5 is a flow diagram of an example verification process.

As described above with reference to FIG. 1, several embodiments perform processes that verify the compatibility of various applications on a simulated platform. In some embodiments, these application verification processes are executed by a verification system, such as the verification system 100 described above with reference to FIG. 1. One example of such a verification process is illustrated in FIG. 5. According to this example, the verification process 500 includes acts of receiving device simulation information 502, simulating device performance 504, and outputting model results 512. The verification process 500 optionally includes the acts of determining whether the simulation performed adequately 506, to determining a device recommendation 508, and deploying a device configuration profile 510.

In the act 502, the verification system receives information regarding the specific scenario that needs to be modeled. The received information may include information descriptive of the current state of a device, or may describe the base configuration that will be modified before deployment to a device. The received simulation information is loaded into a virtual device simulator that simulates the capabilities of the device of interest.

In the act 504, the simulation is performed. The device simulator can run a suite of simulated events (voltage transients, I/O activity, etc) to test the current configuration under stress. The simulated events may be generic representations of common events, or they may be representations of actual events recorded in the past (e.g., events captured at the facility where the target physical device is installed).

In the optional act 506, the verification system determines whether the simulated device performance was adequate. The determination of whether the simulated device performed adequately may include determining whether the simulated device met the requirements of the targeted performance information throughout execution of the allotted tasks within the scenario. The determination of whether the simulated device met requirements of the targeted performance information may be performed by tracking whether each task is performed within the specified amount of time. If the simulated device performs in compliance with targeted performance information, the verification system may proceed to optional act 508. In the act 510, the verification system deploys a device configuration profile to the actual device via a network. Otherwise, the verification system proceeds to optional act 508 and determines a device recommendation. Determining the device recommendation may include determining which devices within a pre-defined set of devices (e.g., as specified in the data store 104) are capable of performing the requested set of tasks and/or applications in compliance with targeted performance information (e.g., targeted performance information included in the device simulation information 110).

In the act 512, the verification system provides a report describing the performance of the application combination during processing of the simulated events. The report may include an indication of the percentage of time each application was executed by the device model in compliance with the targeted performance information. It may also include an indication of when the resources of the modeled device were constrained such that execution of one application was prioritized over another.

Process 500 depicts one particular sequence of acts in a particular embodiment. The acts included in these processes may be performed by, or using, one or more computer systems or programmable devices specially configured as discussed herein. Some acts are optional and, as such, may be omitted in accord with one or more embodiments. Additionally, the order of the acts can be altered, or other acts can be added, without departing from the scope of the embodiments described herein. Furthermore, as described above, in at least one embodiment, the acts are performed on particular, specially configured machines, namely an application verification system configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:
1. A system for verifying applications for Real-Time Execution (RTE) devices, the system comprising:
 a memory;
 at least one processor coupled to the memory;
 a simulation component executable by the at least one processor, the simulation component configured to:
  receive device simulation information for an RTE device;
  configure, based on the RTE device simulation information, a virtual device simulator, the virtual device simulator configured to:
   run a suite of simulated events, the suite of simulated events being used to simulate an RTE device configuration, and
   compare the simulated RTE device configuration to a set criteria;
  run the virtual device simulator; and
  output simulation results; and
 a verification system, the verification system configured to:
  deploy, based on the comparison of the simulated RTE device configuration to the set criteria, the suite of simulated events to the RTE device when the simulated RTE device configuration meets the set criteria, and/or
  identify, based on the comparison of the simulated RTE device configuration to the set criteria, at least one other device capable of running the suite of simulated events when the simulated RTE device configuration does not meet the set criteria.

2. The system of claim 1, wherein the device simulation information includes at least one of: device configuration information, application information, targeted performance information, and historical event information.

3. The system of claim 2, wherein the simulation component is further configured to run the virtual device simulator based on the historical event information.

4. The system of claim 1, wherein the set criteria is targeted performance information, wherein the output simulation results include a determination of whether the virtual device simulator executed the suite of simulated events in compliance with targeted performance information.

5. The system of claim 4, wherein the set criteria is targeted performance information, wherein the output simulation results further include a suggested set of one or more RTE devices configured to execute the suite of simulated events in compliance with targeted performance information.

6. The system of claim 1, further comprising:
 a network interface coupled to the processor and at least one remote device and a deployment component executable by the at least one processor and configured to:
  determine whether the virtual device simulator executed the suite of simulated events in one or more applications in compliance with the set criteria, the set criteria being targeted performance information; and
  deploy the RTE device configuration and applications to the remote device.

7. The system of claim 1, further comprising an application store component executable by the processor and configured to provide one or more users access to RTE applications.

8. The system of claim 7, wherein the RTE device includes a Real-Time Operating System (RTOS) device.

9. The system of claim 8, wherein the RTE applications include RTOS power monitoring applications.

10. A method for verifying applications for Real-Time Execution (RTE) devices, the method comprising:
 receiving, via at least one processor, device simulation information for an RTE device;

configuring, based on the RTE device simulation information, a virtual device simulator, the virtual device simulator being configured to:
  run a suite of simulated events, the suite of simulated events being used to simulate an RTE device configuration, and
  compare the simulated RTE device configuration to a set criteria, the comparison being used to:
    deploy the suite of simulated events to the RTE device when the simulated RTE device configuration meets the set criteria, and/or
    identify at least one other device capable of running the suite of simulated events when the simulated RTE device configuration does not meet the set criteria;
  running the virtual device simulator; and
  outputting simulation results.

11. The method of claim 10, wherein receiving the RTE device configuration information includes receiving at least one of: device configuration information, application information, targeted performance information, and historical event information.

12. The method of claim 11, wherein running the virtual device simulator further includes running the virtual device simulator based on the historical event information.

13. The method of claim 10, wherein the set criteria is targeted performance information, wherein outputting simulation results include outputting a determination of whether the virtual device simulator executed the suite of simulated events in compliance with the targeted performance information.

14. The method of claim 13, wherein the set criteria is targeted performance information, wherein outputting simulation results further includes outputting a suggested set of one or more RTE devices configured to execute the suite of simulated events in compliance with the targeted performance information.

15. The method of claim 10, further comprising:
  determining whether the virtual device simulator executed the suite of simulated events in one or more applications in compliance with the set criteria, the set criteria being targeted performance information; and
  deploying, via a network interface coupled to the remote device and the at least one processor, the RTE device configuration and applications to the remote device.

16. The method according to claim 10, wherein the memory includes a database of RTE applications and the method further comprises providing one or more users access to RTE applications.

17. A non-transitory computer readable medium storing sequences of instructions executable by at least one processor, the sequences of instructions instructing the at least one processor to execute a process of verifying applications for Real-Time Execution (RTE) devices, the sequences of instructions including instructions configured to:
  receive device simulation information for an RTE device;
  configure, based on the RTE device simulation information, a virtual device simulator, the virtual device simulator configured to:
    run a suite of simulated events, the suite of simulated events being used to simulate an RTE device configuration, and
    compare the simulated RTE device configuration to a set criteria;
  run the virtual device simulator; and
  output simulation results,
  wherein the comparison is used to:
    instruct deployment of the suite of simulated events to the RTE device when the simulated RTE device configuration meets the set criteria, and/or
    instruct identification of at least one remote device capable of running the suite of simulated events when the simulated RTE device configuration does not meet the set criteria.

18. The computer readable medium of claim 17, wherein the device simulation information includes at least one of: device configuration information, application information, targeted performance information, and historical event information.

19. The computer readable medium of claim 18, wherein the instructions to run the virtual device simulator includes instructions to run the virtual device simulator based on the historical event information.

20. The computer readable medium of claim 17, wherein the set criteria is targeted performance information, wherein the instructions to output simulation results include instructions to output a determination of whether the virtual device simulator executed the suite of simulated events in compliance with the targeted performance information.

* * * * *